(12) United States Patent
Vaccari et al.

(10) Patent No.: US 12,134,207 B2
(45) Date of Patent: Nov. 5, 2024

(54) MACHINE FOR DRY DECORATION OF TILES

(71) Applicant: SYSTEM CERAMICS S.P.A., Fiorano Modenese (IT)

(72) Inventors: Paolo Vaccari, Modena (IT); Franco Gozzi, Formigine (IT); Franco Stefani, Sassuolo (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 548 days.

(21) Appl. No.: 17/311,126

(22) PCT Filed: Nov. 27, 2019

(86) PCT No.: PCT/IB2019/060214
§ 371 (c)(1),
(2) Date: Jun. 4, 2021

(87) PCT Pub. No.: WO2020/121098
PCT Pub. Date: Jun. 18, 2020

(65) Prior Publication Data
US 2021/0379794 A1 Dec. 9, 2021

(30) Foreign Application Priority Data

Dec. 10, 2018 (IT) .......................... 102018000010925
Jul. 25, 2019 (IT) .......................... 102019000012948

(51) Int. Cl.
*B29C 31/06* (2006.01)
*B28B 5/02* (2006.01)
(Continued)

(52) U.S. Cl.
CPC ............ *B28B 13/022* (2013.01); *B28B 5/021* (2013.01); *B28B 13/028* (2013.01);
(Continued)

(58) Field of Classification Search
CPC ..... B28B 13/022; B28B 5/021; B28B 13/028; B28B 3/02; B28B 1/005; B28B 5/00;
(Continued)

(56) References Cited

U.S. PATENT DOCUMENTS 3,222,434 A * 12/1965 Stedman .................. B28B 1/52
264/109
5,935,617 A * 8/1999 Uchida ................ A23G 3/2023
425/134
2018/0250846 A1 9/2018 Stefani

FOREIGN PATENT DOCUMENTS

CN 1906001 A 1/2007
CN 201056029 Y 5/2008
(Continued)

OTHER PUBLICATIONS

Chinese Office Action from Chinese Patent Application No. 201980080697.9, issued May 18, 2022, 9 pages.

*Primary Examiner* — Jacob T Minskey
*Assistant Examiner* — Caroline Beha
(74) *Attorney, Agent, or Firm* — Pearne & Gordon LLP; J. Gregory Chrisman (57) ABSTRACT

A machine for dry decoration of ceramic slabs or tiles, comprising: a support element (10), provided with a plurality of cavities (11) with a pre-established shape; a dispensing device (20), configured to deposit a pre-fixed amount of powder material inside one or more pre-established cavities (11); an unloading device (30), configured to move the cavities (11) from a loading position, in which they can receive the powder material from the dispensing device (20), to an unloading position, in which they can unload the powder material.

20 Claims, 8 Drawing Sheets

(51) Int. Cl.
*B28B 13/02* (2006.01)
*B30B 5/06* (2006.01)
*B30B 15/30* (2006.01)

(52) U.S. Cl.
CPC .............. *B29C 31/066* (2013.01); *B30B 5/06* (2013.01); *B30B 15/308* (2013.01)

(58) Field of Classification Search
CPC . B30B 5/06; B30B 15/308; B44F 9/04; B29C 31/066
See application file for complete search history.

(56) References Cited

FOREIGN PATENT DOCUMENTS

| | | | | |
|---|---|---|---|---|
| CN | 201552643 | U | 8/2010 | |
| CN | 102152391 | A | 8/2011 | |
| CN | 103568113 | A * | 2/2014 | ............. B28B 13/02 |
| CN | 105500513 | A | 4/2016 | |
| WO | WO-2005068146 | A2 * | 7/2005 | ........... B28B 13/022 |
| WO | WO-2017051275 | A1 * | 3/2017 | ............. B28B 13/02 |

* cited by examiner

MACHINE FOR DRY DECORATION OF TILES

In the production of ceramic tiles, there is frequently a need to produce decorations that reproduce natural stone or wood. As is well known, such materials have veins that extend throughout the entire mass. This means that, when they are processed into slabs, the veins extend from the outer surfaces through the whole thickness, and are thus also visible on the lateral surfaces of the slabs. The veining effect is particularly sought after for the production of kitchen counters or bathroom counters, steps, low walls or edges, in general for the production of finishes in which the lateral surfaces are visible throughout the whole thickness of the slabs.

At present, the creation of veins that extend throughout the whole thickness of a ceramic slab is substantially impossible.

As is well known, ceramic tiles or slabs are obtained by pressing a layer of ceramic material in powder form which is subsequently decorated on a surface by means of various technologies.

The most common technology envisages applying the decoration before the tile is fired, using fluid enamels that are applied on the surface of the tiles with inkjet printers.

Alternatively, the application of a traditional decoration can take place prior to firing, using dry technologies that envisage spreading the decoration in powder or granular form. The decoration then undergoes firing together with the base layer of the tile.

In both cases, the decoration is applied exclusively on the surface of the tile. Using the dry technology it is possible to press the decoration slightly into the base layer; however, a limited penetration will be obtained. This means that the tiles presently obtainable have lateral surfaces that are not decorated and distinctly different from the decorated surfaces.

The object of the present invention is to offer a machine for dry decoration of tiles that enables the limits of the presently available technologies to be overcome.

One advantage of the machine according to the present invention is that it enables decorations to be obtained which extend throughout the entire thickness of a ceramic tile or slab.

Another advantage of the machine according to the present invention is that it enables the production of the decoration to be controlled with great precision.

A further advantage of the machine according to the present invention is that of enabling the deposition of decorations in successive layers, thus offering the possibility of controlling the position and conformation of the different layers with great precision.

Additional features and advantages of the present invention will become more apparent from the following detailed description of one embodiment of the invention, illustrated by way of non-limiting example in the appended figures in which.

The machine according to the present invention comprises a support element (10), provided with a plurality of cavities (11) with a pre-established shape and depth or height. Each of the cavities (11) has an opening that enables the entry of the powder material and a subsequent unloading of the powder material that was previously introduced. Each cavity (11) is delimited by a lateral wall and a bottom which can be substantially flat or curved.

The support element (10) can be made in the form of a flat element, in whose thickness the cavities (11) are formed. Alternatively, the cavities (11) can be structured in such a manner as to be able to be applied on the support element (10). In a possible embodiment, the support element (10) comprises a layer of flexible material, for example a rubber or plastic material, in whose thickness the cavities (11) are formed.

In a particularly advantageous embodiment, the support element (10) comprises a flexible belt in which the cavities (11) are formed and open out onto the surface of the belt itself. For example, the cavities (11) can be formed by engraving or by impression on the surface of the flexible belt. In the preferred, but non-exclusive embodiment illustrated, the support element (10) is in the form of a flexible belt, closed in a loop.

A dispensing device (20), which will be better described below in the description, is configured to deposit a pre-fixed amount of powder material inside one or more pre-established cavities (11).

The machine further comprises an unloading device (30), configured to move the cavities (11) from a loading position, in which they can receive the powder material from the dispensing device (20), to an unloading position, in which they can unload the powder material. In a particularly advantageous embodiment, the unloading device (30) is structured so as to move the cavities (11) between a loading position, in which they are turned upward so as to receive the powder material from the dispensing device (20), and an unloading position, in which they are turned at least partially downward so as to unload the powder material downward, substantially by gravity. The movement made between the loading position and the unloading position by the unloading device (30) takes place by translation along a longitudinal direction (Y) of forward travel, as will be better clarified below.

Figure 2:
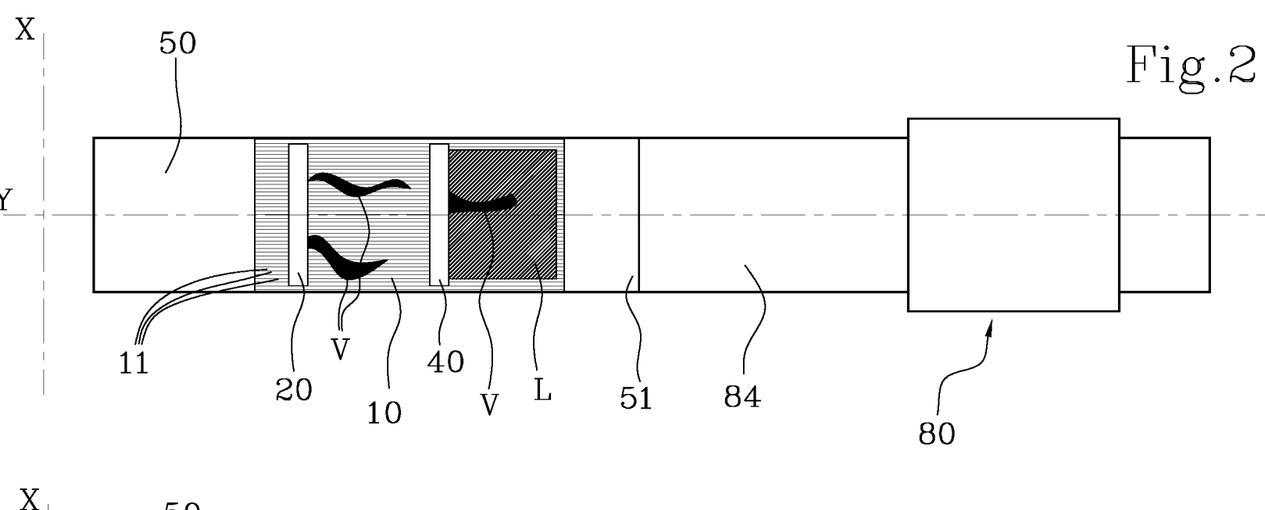
FIG. 2 shows a plan view of the machine of FIG. 1, in a first embodiment.
Figure 2A:
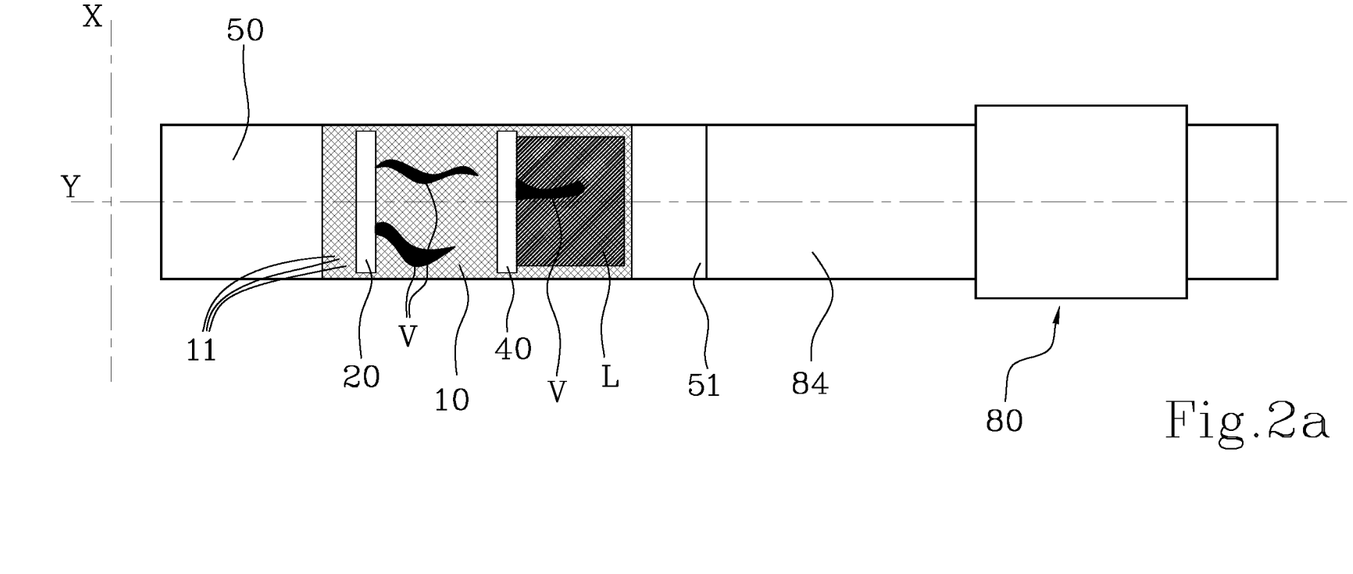
FIG. 2a shows a plan view of the machine of FIG. 1, in a second embodiment.
Figure 3:
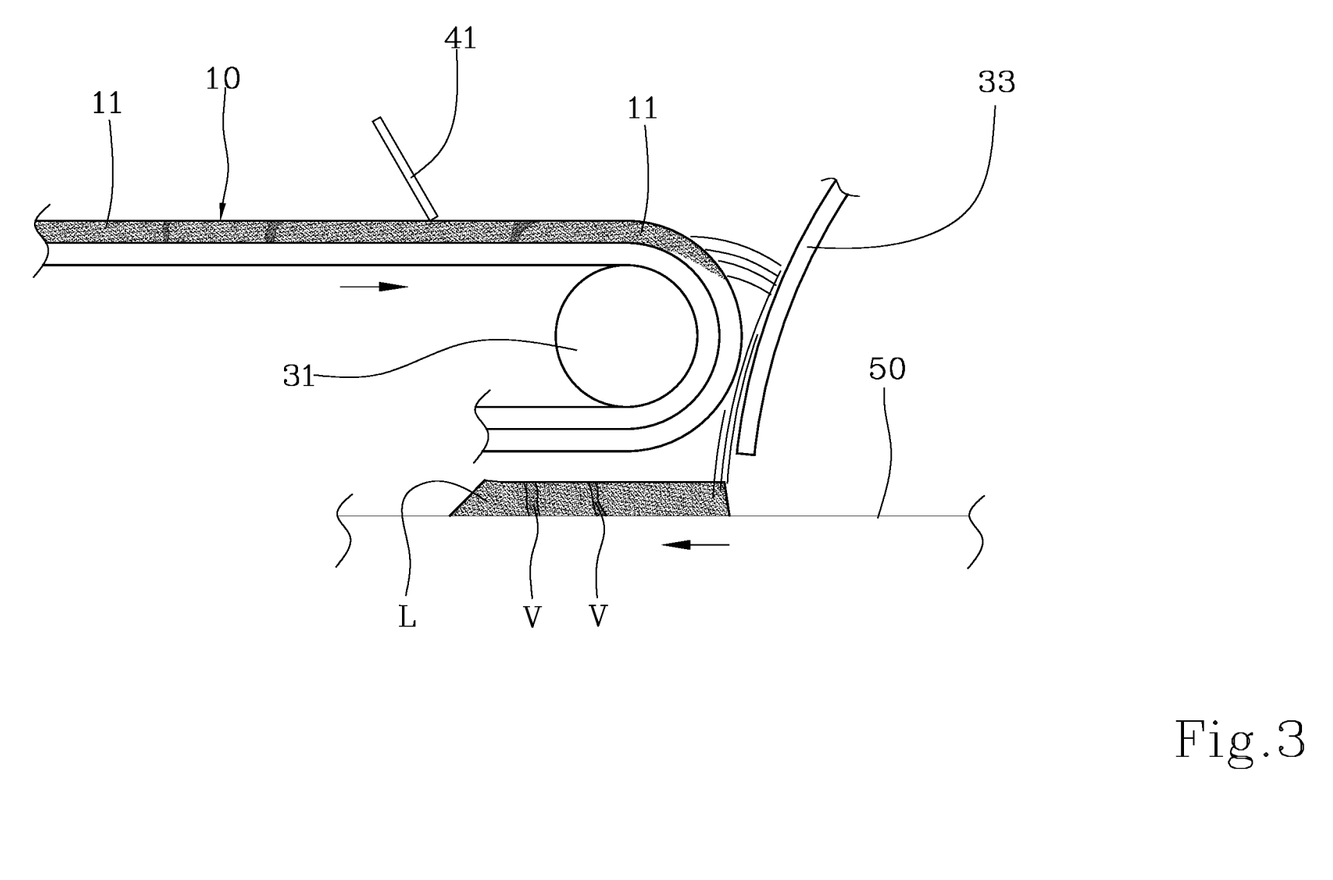
FIG. 3 shows an enlarged view of the area III of FIG. 1, in a first embodiment.
Figure 3A:
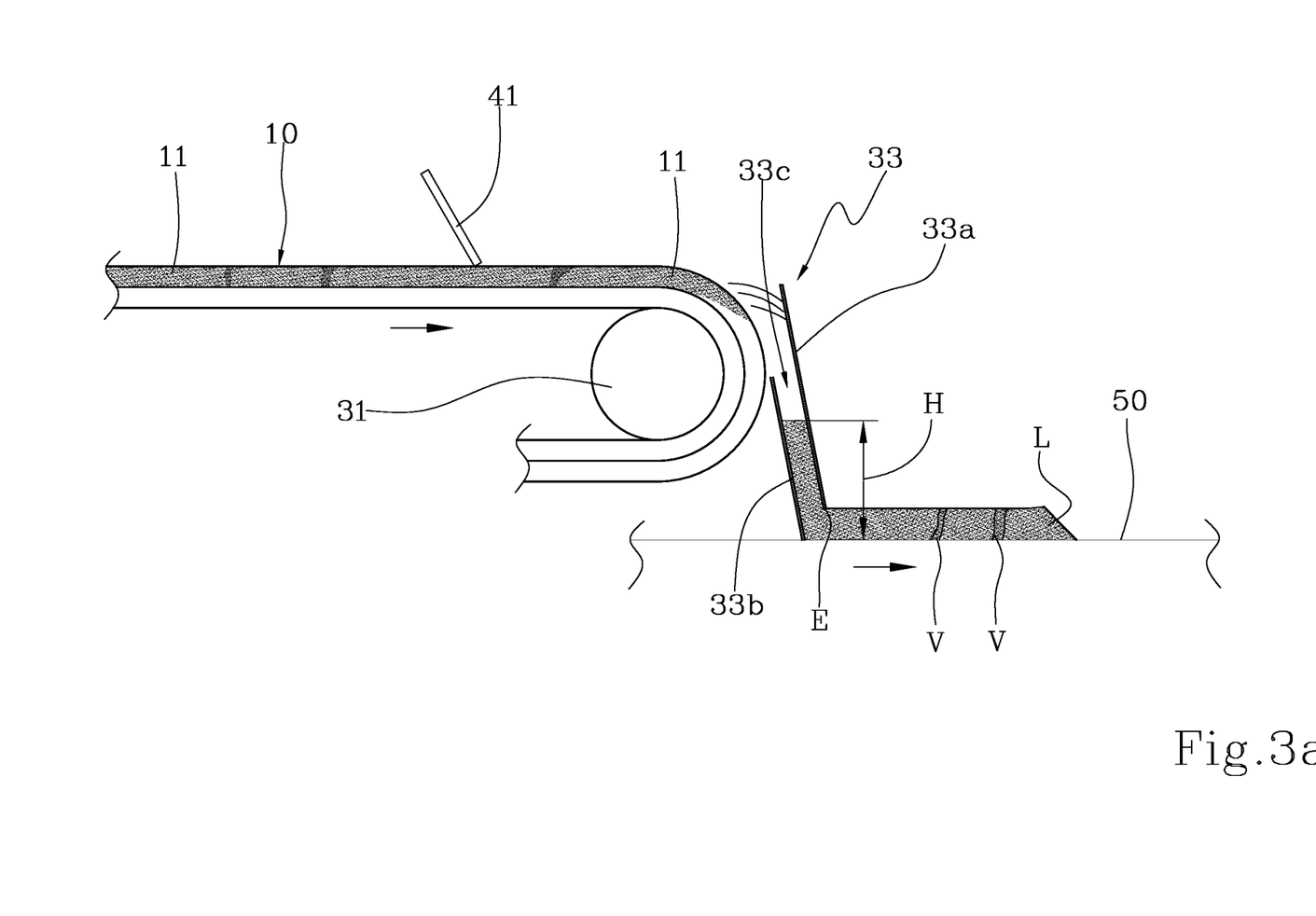
FIG. 3a shows an alternative embodiment of the area III of FIG. 3.

In a first preferred, but non-exclusive embodiment, the cavities (11) comprise a plurality of elongate grooves, parallel to one another, as schematically illustrated in FIGS. 2, 3 and 3a. The elongate grooves have a closed bottom and are laterally delimited by two walls, which can be parallel or inclined relative to each other and convergent towards the bottom. In a possible embodiment, the elongate grooves have a V-shaped section on a transversal plane. The cavities (11) are preferably adjacent to one another.

In this first embodiment, the cavities (11) can be disposed parallel to the longitudinal direction (Y) of forward travel, or else they can be inclined relative to the longitudinal direction (Y) on the same plane as the latter. Preferably, but not necessarily, the cavities (11) are all in the form of elongate grooves. Furthermore, the cavities (11) occupy the entire surface of the support element (10). This favours filling of the cavities (11) themselves.

Figure 3B:
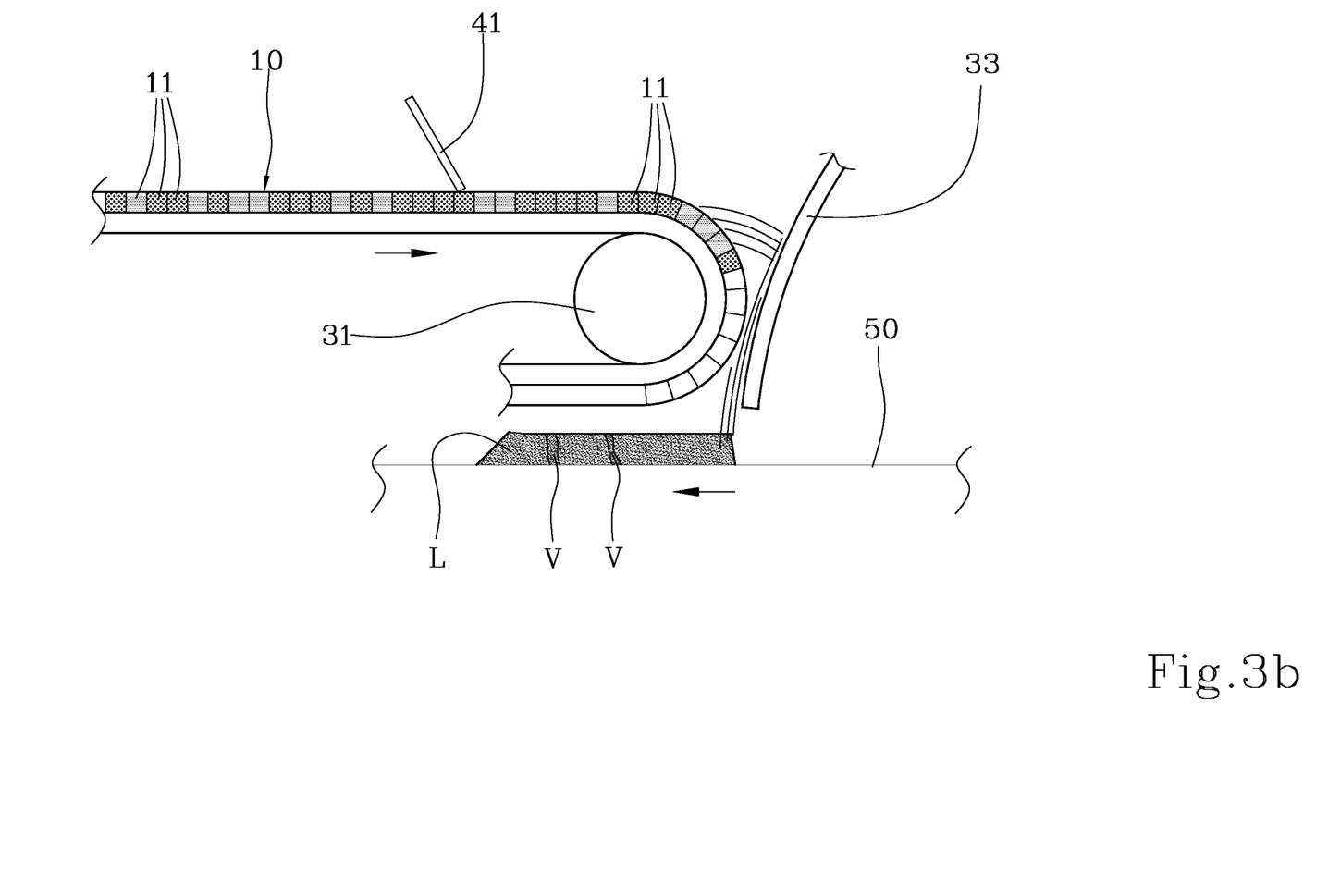
FIG. 3b shows a second embodiment of the area III of FIG. 1.
Figure 3C:
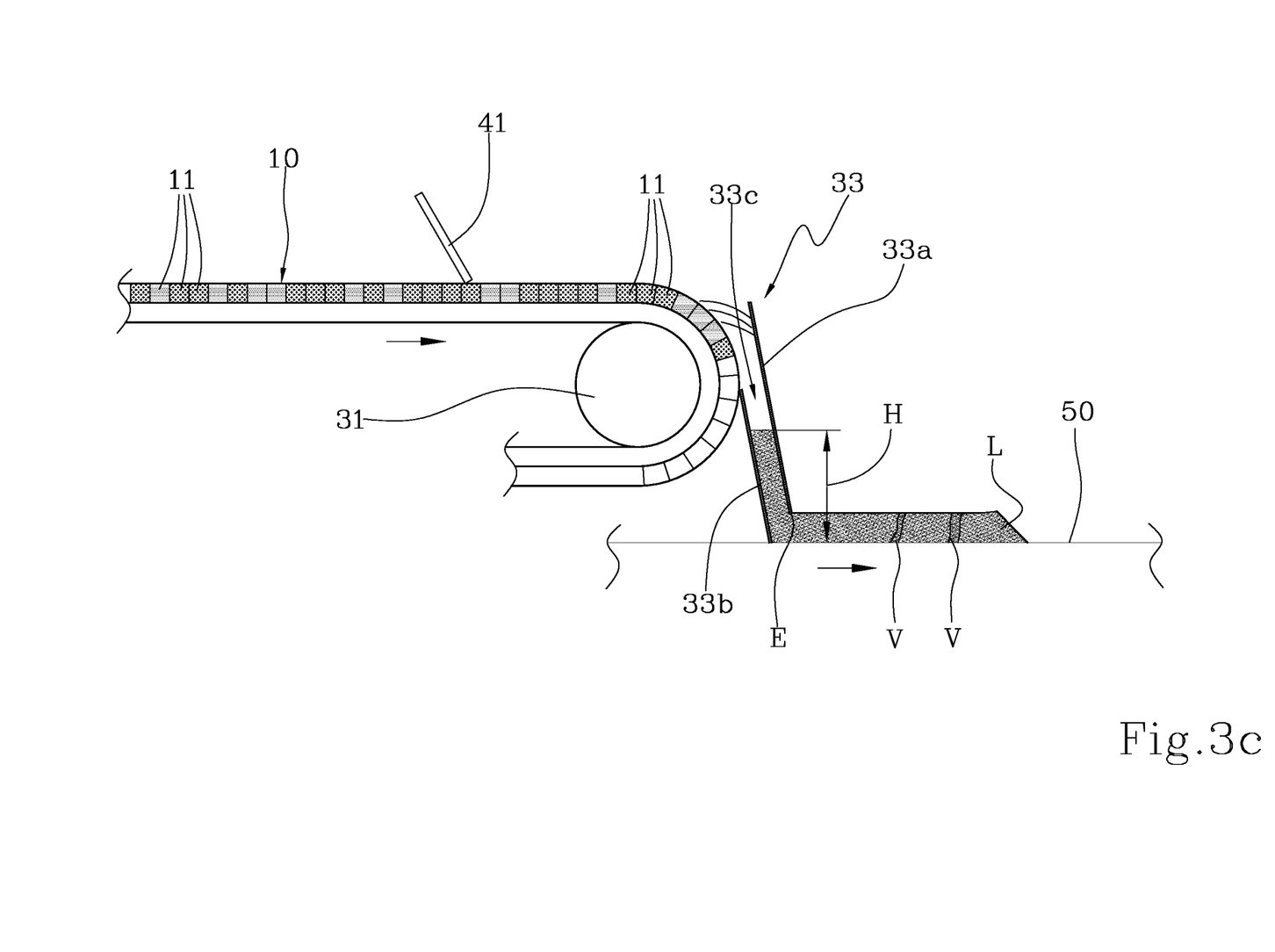
FIG. 3c shows an alternative embodiment of the area III of FIG. 3b.
Figure 4:
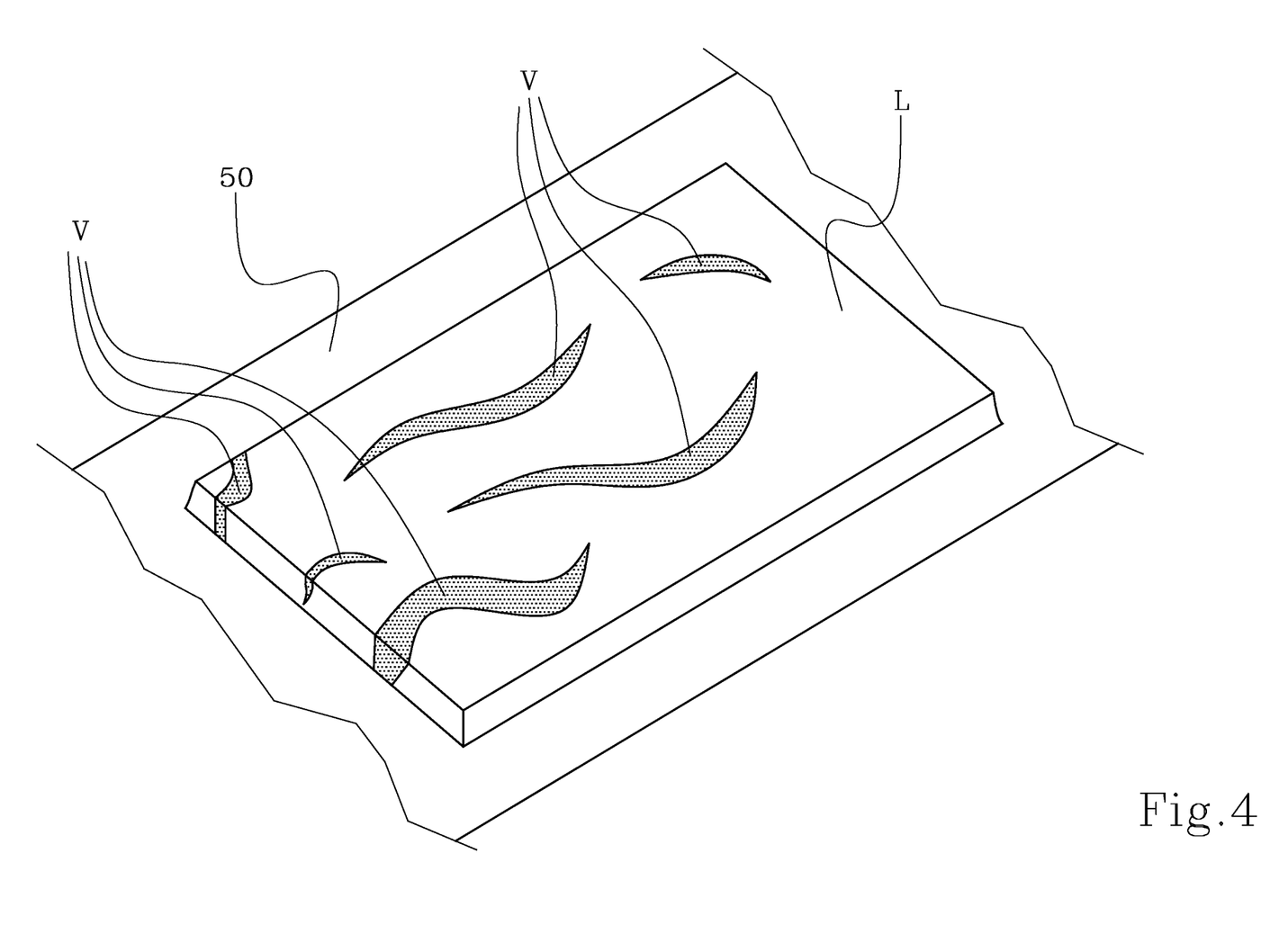
FIG. 4 schematically shows a layer of material deposited with the machine according to the present invention.

In a second possible embodiment, shown in FIGS. 3b and 3c, the cavities (11) have a prismatic shape, for example they have a rhomboidal contour, but other shapes are obviously possible. The rhomboidal shape of the cavities ensures a better continuity of resting contact with a blade (41), which will be described subsequently.

In the preferred embodiment, in which the cavities (11) comprise a plurality of elongate grooves, the formation of the cavities (11) on the surface of the support element (11) is particularly simple and advantageous. The cavities (11) can in fact be formed by removing material on the surface of the support element (10). For example, the cavities (11) can be formed by means of a cutting or abrasive tool, placed in contact with the support element (11) while the latter slides forward in a direction parallel to the longitudinal direction (Y). If the tool is kept stationary during the forward movement of the support element, the cavities (11) will be formed parallel to one another. Upon the completion of one cavity (11), the tool is moved transversally in order to produce the parallel cavity (11). Alternatively, the tool can be translated laterally, during the forward movement of the support element (10) in a closed loop path. In such a case, it is possible to produce a single cavity (11) substantially in the form of adjacent coils that pass over the entire surface of the support element (10). The coils are parallel to one another and have an inclination relative to the longitudinal direction (Y) that depends on the ratio between the speed of transversal movement of the tool and the forward travel speed of the support element (10). In the loop embodiment of the support element (10), the cavities (11), in the form of elongate grooves, extend for the whole length of the support element (10). This favours the filling and unloading of the cavities (11) themselves.

Preferably, but not necessarily, the cavities (11) are identical to one another and are distributed over the support element (10) in a regular manner. The cavities (11) are adjacent to one another along their sides, so as to be separated by a relatively thin edge. In other words, each of the cavities (11) defines a volume suitable for receiving a part of powder material for the decoration to be produced. Each cavity (11) can be filled independently of the others.

As already mentioned, the machine according to the present invention comprises at least one dispensing device (20), configured to deposit a pre-fixed amount of powder material inside one or more pre-established cavities (11). The dispensing device (20) comprises, for example, a hopper, provided with a discharge opening. The discharge opening comprises, for example, a number of discharge nozzles or conduits.

The dispensing device (20) can be allowed the possibility of moving relative to the cavities (11), i.e. relative to the support element (10). In particular, the dispensing device (20) and/or the discharge opening of the dispensing device (20) are capable of moving so as to be able to dispense the powder material into any one of the cavities (11). Preferably, but not necessarily, both the cavities (11), by means of the support element (10), and the dispensing device (20) are allowed the possibility of translating along at least one direction of movement. In the embodiment represented, the cavities (11) are mobile, by means of the support element (10), along a longitudinal direction (Y), whereas the dispensing device (20) and/or the discharge opening are mobile along a transversal direction (X), perpendicular to the longitudinal direction (Y). In the example represented, both directions (X,Y) are horizontal. Both the cavities (11) and the dispensing device (20) and the discharge nozzles or valves thereof could also be mobile along a direction perpendicular to the one indicated above, i.e. the cavities (11) could also be mobile along the transversal direction (X), and the dispensing device (20) and the discharge opening thereof could be mobile along the longitudinal direction (Y).

More preferably the machine comprises a number of dispensing devices (20), each of which can contain a pre-fixed colour or mixture of colours. In particular, the dispensing device (20) can contain within it or be made up of a number of valves or conduits or nozzles arranged transversally to the support element (10), which can be controlled digitally so as to open and close and thus allow the passage of the coloured powder material from each dispensing device (20) to the cavities (11).

In other words, the dispensing device (20) could be provided with a number of dispensing elements, for example valves or conduits or nozzles, which can be controlled digitally so as to open and close, and each of which is configured to dispense the powder material into one or more cavities (11) selected in advance. As already mentioned, the dispensing device (20) could be in the form of a hopper provided with a bottom opening disposed transversely to the longitudinal direction (Y) for the entire width of the support element (10), i.e. for the entire extent of the support element (10) measured parallel to the transversal direction (X). In this manner, the dispensing device (20) is able to deposit material on an area of the support element (10) that is parallel to the transversal direction (X).

Each dispensing element (20) could further be mobile in the ways described above, or else be translatable along the transversal direction (X) and/or along the longitudinal direction (Y).

As already mentioned, the machine according to the present invention comprises an unloading device (30), configured to move the further cavities (11) from a loading position, in which they can receive the powder material from the dispensing device (20), to an unloading position, in which they can unload the powder material.

In the embodiment wherein the support element (10) is flexible, the unloading device (30) comprises at least one rotating roller (31), around which the support element (10) is at least partially wrapped. The roller (31) carries the support element (10) in rotation so as to progressively move the cavities (11) from the loading position to the unloading position. In a possible embodiment, the support element (10) thus takes on a cylindrical shape. During the rotation of the roller (31), the cavities (11) travel along a circumference along which, at least for a portion thereof, they are turned upward in the loading position, and for at least another portion thereof they are turned downward, in the unloading position. The dispensing device can be situated above the support element (10), in order to unload the powder material towards the cavities (11), in the area in which the latter are turned upward in the loading position. In this embodiment, the cavities (11) could be formed on the surface of the roller (31), which would substantially take on the function of the support element (10).

In the preferred, but non-exclusive embodiment illustrated, the support element (10) is in the form of a flexible belt. The unloading device (30) comprises a pair of rollers (31,32), around which the support element (10) is wrapped, so as to define a closed loop path. The cavities (11) are turned towards the outside of said closed path.

Along the path defined by the rollers (31,32), the support element (10) has an upper portion (10a), along which it slides forward along the longitudinal direction (Y) and along which the cavities (11) are turned upward, in the loading position. The dispensing device (20) can be situated above the support element (10), i.e. above the upper portion of the support element (10), so as to able to unload the powder material downward and towards the cavities (11).

The loading of the cavities (11) can take place by combining a forward motion of the support element (10) along a longitudinal direction (Y) with a shifting motion of the dispensing device (20) along a transversal direction (X), perpendicular to the longitudinal direction (Y), as already pointed out previously. Essentially, while the support element (10) moves forward, the dispensing device (20), by means of the discharge conduits or nozzles, delivers the powder material to the cavities (11) in a selective and targeted manner, if necessary by translating along the transversal direction (X). This enables the powder material, contained in the dispensing device, to be delivered towards pre-established cavities (11), and not towards others. Downstream of the dispensing device (20) there can be provided a filling device (40), provided with a discharge opening disposed in such a way as to fill up the cavities (11) that were not filled or only partially filled by the dispensing device (20). The filling device (40) contains a second powder material which can be different from the one dispensed by the dispensing device (20), for example in terms of colour, particle size or other characteristics. The second powder material, unloaded by the filling device (40), fills up the cavities (11) that have remained empty or partially empty downstream of the dispensing device (20), and covers the cavities (11) already filled up by the dispensing device (20). A blade (41) is disposed in contact with the upper portion of the support element (10), downstream of the filling device (40), so as to remove the powder material that exceeds the depth or height of the cavities (11), and thus projects from the upper surface of the support element (10). The blade (41) is preferably integral with the filling device, i.e. it is defined by an edge of the filling device (40). In this manner, downstream of the blade (41), some cavities (11) are filled up with the first powder material, unloaded by the dispensing device (20), other cavities (11) are filled up with the second powder material, dispensed by the filling device (40), and still other cavities (11) can be filled with both the first and second powder materials. The two powder materials can thus be deposited in the cavities (11) in such a way as to define a decorative pattern that extends overall for the entire height of the cavities (11), i.e. it can extend from the bottom to the top of each cavity (11). The decorative pattern is discretised, i.e. broken down in the mutually adjacent cavities (11) which maintain the conformation thereof stable. This is because each cavity (11) prevents the powder material contained therein from being able to mix with the powder material contained in the adjacent cavity. The above-described filling of the cavities (11) can also be obtained using a dispensing device (20) provided with one or more dispensing elements, each intended to dispense powder material in one or more cavities (11) selected in advance. For example, such dispensing elements can be placed consecutively, one next to the other, transversely and above the upper portion of the support element (10). This enables particularly variegated and elaborate decorative patterns to be created.

The filling of the cavities (11) can take place by combining a forward motion along the longitudinal direction (Y) of the support element (10) with a motion along the transversal direction (X) of the dispensing device (20) and/or dispensing elements. Alternatively, the support element (10) could be kept stationary, and the dispensing device (20), comprising any dispensing elements, could be mobile both along the longitudinal direction (Y) and along the transversal direction (X).

As already indicated, the rollers (31,32) carry the support element (10) slidingly along a closed path in such a way as to progressively move the cavities (11) from the loading position to the unloading position. In the passage from the loading position to the unloading position, the cavities (11) pass from a position in which they are turned upward to a position in which they are turned downward. During this passage, each cavity (11) can pour its contents downward. As schematically shown in FIG. 3, the passage of the cavities (11) from the loading position to the unloading position takes place progressively along the portion of the support element (10) that revolves around a first roller (31). When each cavity (11) is turned downward, i.e. after having passed entirely over the first roller (31), the pouring of the contents is substantially complete. By revolving around the second roller (32), the cavities (11) bring themselves back into the loading position, so as to receive a new load of powder material.

In a possible embodiment, not illustrated, the unloading device (30) could be positioned in such a way as to unload the powder material contained in the cavities (11) directly into the mould of a press.

In the solution represented, a deposition surface (50) is situated below the support element (10), so as to receive the powder material unloaded from the cavities (11). Between the support element (10) and the deposition surface (50) there is provided a relative motion, directed along the longitudinal direction (Y), which takes place simultaneously with the unloading of the powder material from the cavities (11). This enables the powder material unloaded from the cavities (11) to be deposited in a continuous layer (L) on the deposition surface (50).

The relative motion between the deposition surface (50) and the support element (10) can be obtained, for example, by keeping the deposition surface (50) stationary and translating the support element (10), integrally with the unloading device (30), along the longitudinal direction (Y), i.e. by translating the rollers (31,32), and the support element (10) associated therewith along the longitudinal direction (Y).

Figure 1:
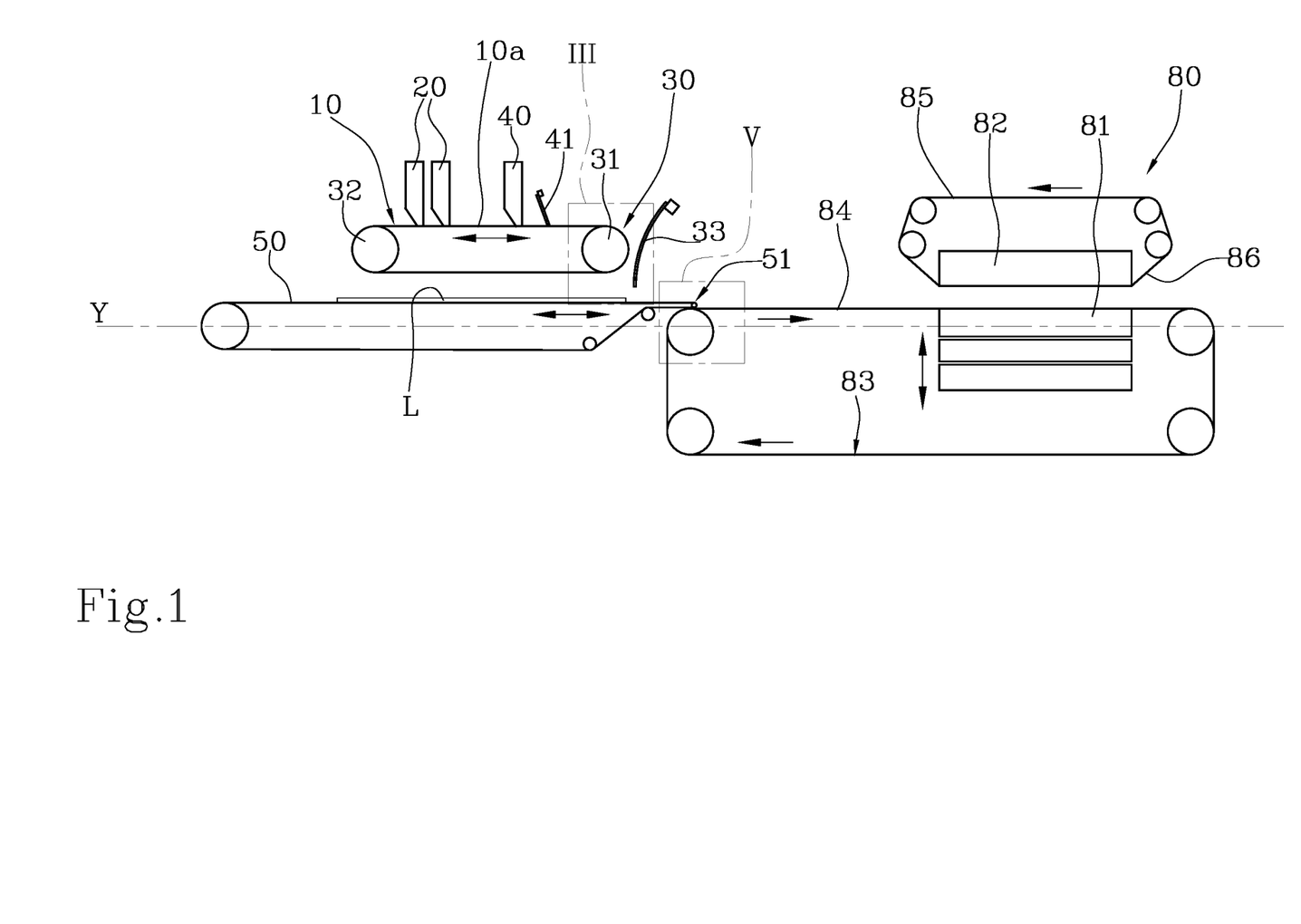
FIG. 1 shows a schematic vertical elevation view of the machine according to the present invention.

In a preferred embodiment, the relative motion between the deposition surface (50) and the support element (10) is obtained by sliding the deposition surface (50) along the longitudinal direction (Y), while the support element (10), despite being slidable along its path around the rollers (31,32), is static on the whole along the direction (Y). The sliding of the deposition surface (50) can be in the same direction as or opposite to the sliding of the upper portion of the support element (10) in its motion around the rollers (31,32). Preferably, but not necessarily, the deposition surface (50) is in the form of a mobile belt sliding along a closed path defined by two or more rollers, as shown in FIG. 1.

In the embodiment represented, the powder material is unloaded from the cavities (11) and deposited on the underlying deposition surface (50). As already indicated, the unloading of the cavities (11) takes place by means of the sliding of the support element (10), in the portion in which the support element (10) revolves around the first roller (31). Along said portion, the cavities (11) in fact pass from the loading position, in which they are turned with their opening facing upward, to the unloading position, by turning their opening progressively downward and, simultaneously, unloading their content of powder material downward.

The relative motion between the deposition surface (50) and the support element (10) results in the ceramic material being deposited in a continuous layer (L). By adjusting the relative speed between the deposition surface (50) and the support element (10) it is possible to adjust the thickness or height of the layer that is formed on the deposition surface (50). In the embodiment represented, wherein the unloading device (30) is stationary, this variation can be obtained by varying the sliding speed of the deposition surface (50) and/or the sliding speed of the support element (10).

In a possible embodiment of the machine, a control processor is set up to control the dispensing device (20) in such a way as to fill the cavities (11) in relation to the decoration (V) it is intended to produce in the layer (L). To this end, the control processor is provided with an algorithm that makes it possible to process an image of the decoration (V) so as to break it down into a series of volumes of powder material, of a pre-fixed colour, each of which is attributed to a pre-fixed cavity (11). The control processor thus regulates the operation of the dispensing device (20) in such a way that each volume is introduced into a pre-fixed cavity (11). The correspondence between each volume and a respective cavity is established by making known to the control processor the position of each cavity (11), the speed of the support element (10) and the speed of the first deposition surface (50), for example by means of an encoder, sensors or optical systems that are known in the art. Essentially, based on the decoration (V) it is intended to produce, the control processor defines the number and position of the volumes of material necessary to obtain it, and attributes each volume to a cavity (11), in relation to the position in which the volume contained in the cavity (11) will be unloaded on the deposition surface (50).

In a preferred embodiment of the machine, the sliding of the deposition surface (50) is opposite to the sliding of the upper portion of the support element (10) in its motion around the rollers (31,32). This enables the first deposition surface (50) to be disposed below the unloading device (30), in such a way as to contain the overall dimensions of the machine along the longitudinal direction (Y). Essentially, it is sufficient that an end portion of the deposition surface (50) projects beyond the front end of the support element (10), so as to enable the deposition of the layer (L), while the remaining part of the deposition surface (50) extends below (30).

In order to improve the deposition of the material on the deposition surface (50), so as to preserve the decoration distributed in the cavities (11) by means of the dispensing device (20), it is preferable to reduce the distance between the upper portion of the support element (10) and the deposition surface (50) to a minimum. For example, the distance between the upper portion of the support element (10) and the deposition surface (50) can be can be reduced by providing a first roller (31) of a reduced diameter.

In order to favour the maintenance of the structure of the decoration, it is possible to provide a containment barrier (33), disposed and shaped in such a way as to intercept the material that is unloaded from the cavities (11), so as to guide or divert its trajectory in a pre-established manner. In the embodiment represented, the containment barrier (33) is situated in proximity to the first roller (31), i.e. in proximity to the area in which the unloading of the cavities (11) takes place. In the embodiment represented, the barrier (33) has a curved shape with a curvature opposite to that of the first roller (31) and is set alongside the first roller (31). The barrier (33) extends for a pre-established arc, up to an area from which it is desired that the unloading of the material towards the deposition surface (50) takes place.

In the embodiment illustrated in FIG. 3a, the barrier (33) comprises a pair of walls (33a, 33b) set side by side so as to define a collection space (33c). Preferably, but not necessarily, the collection space (33c) is further delimited by two further transversal walls, not represented, which join the walls (33a,33b).

A first wall (33a) is situated in proximity to the first roller (31), i.e. in proximity to the area in which the unloading of the cavities (11) takes place (11). As in the case of the barrier (33), the first wall (33a) is disposed and shaped in such a way as to intercept the material that is unloaded from the cavities (11), so as to guide or divert its trajectory inside the collection space (33c). The second wall (33b) is situated upstream of the first wall (33a) relative to the direction of forward travel of the cavities (11). The second wall (33b) is placed in such a way as not to interfere with the material that is projected forward by the cavities (11), but rather to contain the material, intercepted by the first wall (33a), which falls downward. For this purpose, the second wall (33b) has an upper edge situated at a lower height relative to the trajectory followed by the material unloaded from the cavities (11). For example, the upper edge of the second wall (33b) is situated below the horizontal diametral plane of the first roller (31).

The two walls (33a,33b) preferably have an inclination that is close to the vertical, in order to limit the internal sliding of the material.

Essentially, in the embodiment represented, the two walls (33a,33b) define a hopper that collects the material coming from the cavities (11) and deposits it on the deposition surface (50).

The first wall (33a) has a lower edge (E) that is raised by a certain height relative to the deposition surface (50). The material accumulated inside the collection space (33c) is progressively deposited on the deposition surface (50) and is drawn forward by the latter, passing below the lower edge (E), which also enables the upper surface of the continuous layer (L) to be levelled. The second wall (33b) preferably has a lower edge close to the deposition surface (50), at a height such as to prevent any passage of material. In the embodiment of FIG. 3a, the deposition surface (50) preferably moves in the same direction as the cavities (11). By accumulating inside the collection space (33) and being progressively unloaded on the deposition surface (50), the material maintains the decoration (V) it is intended to produce in the layer (L).

The forward travel speed of the deposition surface (50) and the forward travel speed of the support element (10) are adjusted in such a way that the amount of material accumulated in the collection space (33c) remains substantially constant. This makes it possible to control the structure of the decoration (V) with great precision, and to transfer the decoration (V) with the expected configuration and definition on the deposition surface (50).

The forward travel speed of the deposition surface (50) and the forward travel speed of the support element (10) are preferably adjusted in such a way that the height (h), measured relative to the deposition surface (50), of the material inside the collection space (33c) remains substantially constant. In addition to the advantages indicated above, maintaining a constant height (h) makes it possible to reduce the drop of the material from the support element (10) downward. The material, in fact, does not fall from the support element (10) to the deposition surface (50), but rather undergoes a smaller drop, from the support element (10) to the height (h) in the collection volume (33c).

The machine according to the present invention can be used to produce a decoration (V) comprising two or more layers superimposed one on top of the other. For this purpose, the machine can be equipped with two or more decorator units, each comprising a support element (10), one or more dispensing devices (20) and an unloading device (30), arranged in succession or in such a manner as to be able to act in succession relative to each other. In this possible embodiment, the different decorator units can be located in succession above the deposition surface (50). The first decorator unit in succession can deposit a first layer of powder material in the ways already described. The first layer of powder material, by means the deposition surface (50), can be conveyed forward along the longitudinal direction (Y) until passing below a second decorator unit, which can deposit a second layer of powder material on the previous one, and so on depending on how many decorator units are to be used. Each layer has its own decoration, produced by means of the dispensing device (20) and the cavities (11) of the respective decorator unit.

In order to produce a decoration in several layers, it is also possible, as an alternative to the solution described above, to use a single decorator unit to deposit several layers superimposed one on top of the other. For example, a decorator unit, comprising a support element (10), a dispensing device (20) and an unloading device (30), can be allowed the possibility of translating in opposite directions along the longitudinal direction (Y). In this case, the deposition surface (50) could be maintained fixed, and the decorator unit could complete successive strokes forward to deposit successive layers one on top of the other, alternating with return strokes in the opposite direction. Alternatively, the decorator unit could be maintained fixed, and the deposition surface (50) could be actuated so as to slide along the longitudinal direction (Y) in opposite directions. In such a case, the deposition surface (50) could complete successive strokes forward so as to receive successive layers one on top of the other, alternating with return strokes in the opposite direction. Essentially, the movements of the decorator unit and of the deposition surface (50) can be coordinated with each other so as to enable the successive deposition of several layers one on top of the other.

The decorations of the various superimposed layers can be aligned with each other so as to obtain an overall decoration (V), distributed in the overall thickness of the various superimposed layers. This therefore makes it possible to produce decorations with a veining effect (V) which, concretely, extends throughout the whole thickness of the overall layer of material, obtained by superimposing the various layers, each endowed with its own decoration.

The layer (L) of powder material unloaded from the cavities (11) subsequently undergoes pressing, whether it be a layer obtained from a single passage of the machine, or a layer obtained by superimposing several successive layers. For this purpose, as already mentioned, the machine according to the present invention could be set up in such a way as to unload the cavities (11) inside the mould of a press. In this case as well, the unloading of the material could take place in several superimposed layers.

In the solution represented, the layer of material unloaded from the cavities (11) on the deposition surface (50) is fed to a press (80). For example, the press (80) is in the form of a belt press known in the art for pressing large-sized slabs. A press of this type comprises a lower die (81), provided with a pressing surface facing upward. An upper die (82), provided with a pressing surface facing downward, is situated above the lower die. At least one of the two dies is movable towards and away from the other in order to carry out pressing of a layer (L) of ceramic material in powder form. The press further comprises a mobile surface (83), in the form of a flexible belt, that has an active portion (84) disposed at least partially between the upper die (82) and the lower die (81). The press also comprises a second mobile surface (85), in the form of a flexible belt, that has an active portion (86) disposed between the active portion (84) of the first mobile belt (83) and the upper die (82).

The deposition surface (50) of the machine according to the present invention is located upstream of the mobile surface (83), in such a way as to feed to the latter the layer of powder material unloaded from the cavities (11). The transfer of the layer (L) from the deposition surface (50) to the mobile surface (83) preferably takes place according to the solution described in the publication WO2017051275. According to that solution, the deposition surface (50), in the portion on which the layer (L) is deposited, is substantially aligned and contiguous, at a greater height, to the active or outgoing portion (84) of the mobile surface (83), along the longitudinal direction (Y).

Figure 5:
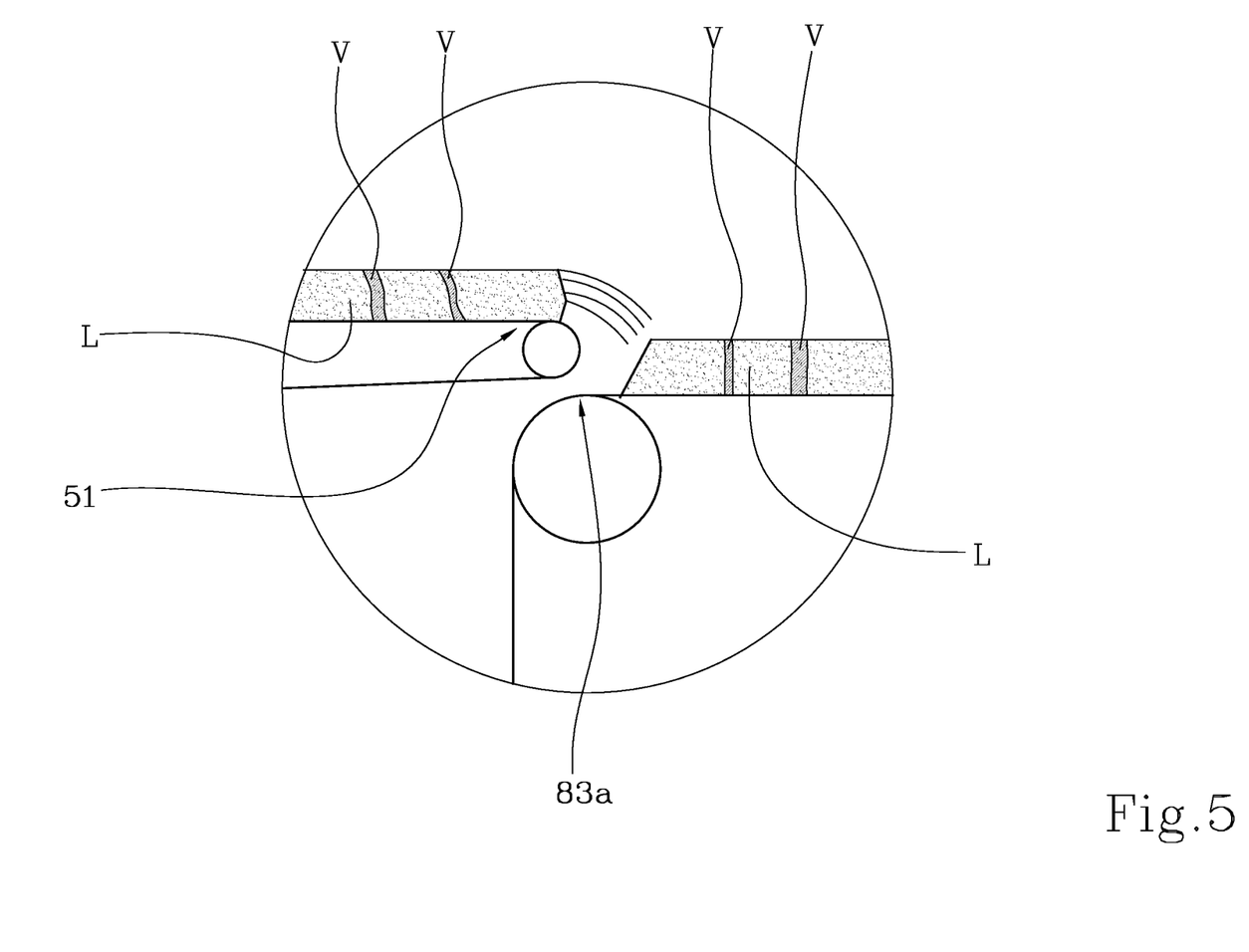
FIG. 5 shows an enlarged view of the area V of FIG. 1.

As may be seen in FIG. 5, the deposition surface (50) comprises a front end (51) that defines a terminal portion at which the first deposition surface (50) defines a return curve. The front end (51) is at least partially above a rear end (83a) of the mobile surface (83).

When the deposition surface (50) and the mobile surface (83) are made to travel forward in synchrony, that is, in the same forward travel direction, the layer (L) is transferred from the deposition surface (50) to the mobile surface (83), undergoing a modest drop downward at the front end (51) of the deposition surface (50).

The deposition surface (50) and the mobile surface (83) are movable independently of each other, i.e. each of them is equipped with its own motor means that can be actuated independently of the others. This enables a particularly effective working cycle which considerably limits downtimes. In fact, once the deposition of the layer (L) on the deposition surface (50) is completed, the latter can be accelerated in its forward movement in the same direction as the mobile surface (83) of the press (80). The two surfaces (50,83) can be synchronised with each other so that, for example, the transfer of a layer (L) from the deposition surface (50) to the mobile surface (83) takes place during the evacuation from the press (80) of an already pressed layer (L), taking duly into account the necessary phases of acceleration and deceleration. This means that the actuation of the mobile surface (83) of the press (80) need not take account of the step of depositing the layer (L), and can thus take place at a greater speed than is required for the deposition of the layer (L).

The deposition of the material from the cavities (11) to the deposition surface (50) and the deposition of the material from the deposition surface (50) to the mobile surface of the press (83) takes place from top to bottom, by gravity, along a falling direction.

Since the support element (10), the deposition surface (50) and the mobile surface (83) are moving in relation to one another, between the falling material and the underlying deposit destination, deposition surface (50) or mobile surface (83), a relative motion is produced which has a component directed parallel to the longitudinal direction (Y).

Because of this relative motion, a vein of material which, ideally, should be deposited vertically on a vertical plane parallel to the longitudinal direction (Y), is instead inclined, from top to bottom, in the direction of the relative motion. The inclination of the vein is illustrated schematically in FIGS. 3 and 5, in reference to a decoration or veining (V). Given that two distinct depositions of material are provided for, one from the cavities (11) to the deposition surface (50), the other from the deposition surface (50) to the mobile surface (83) of the press, it is possible to correct the inclination of the vein of material, and thus the inclination of the veining (V). To this end, the deposition surface (50) and the mobile surface of the press (83) are actuated in such a way as to produce relative motions in an opposite direction in the passage of the material from the cavities (11) to the deposition surface (50) and from the latter to the mobile surface (83) of the press.

For example, in the preferred embodiment of the machine, the sliding of the deposition surface (50) is opposite to the sliding of the upper portion of the support element (10) in its motion around the rollers (31,32). The relative motion that is produced during the fall of the material from the cavities (11) to the deposition surface (50) is thus directed in a first direction, from right to left in FIGS. 1 and 3. This causes the inclination of the veining (V) schematically illustrated in FIG. 3.

The transfer of the layer (L) from the deposition surface (50) to the mobile surface (83) of the press (80), by contrast, takes place in the same direction of forward travel. The relative motion that is produced during the fall or passage of the material from the deposition surface (50) to the mobile surface (83) is thus directed in the opposite direction relative to the one produced in the passage from the cavities (11) to the deposition surface (50). This makes it possible, therefore, to incline the veins (V) in the opposite direction, as schematically illustrated in FIG. 5, so as to bring the veins (V) to a substantially vertical inclination, or in any case to a desired inclination.

Furthermore, by adjusting the relative speed between the deposition surface (50) and the mobile surface (83) it is possible to vary the thickness of the layer (L) on the mobile surface (83).

The invention claimed is:

1. A machine for dry decoration of ceramic slabs or tiles, characterised in that it comprises:
    a support element (10), provided with a plurality of cavities (11) with a pre-established shape;
    at least one dispensing device (20), configured to deposit a pre-fixed amount of powder material inside one or more pre-established cavities (11), wherein the cavities (11) comprise a plurality of elongate grooves, parallel to one another and continuous in the longitudinal direction;
    an unloading device (30), configured to move the cavities (11) from a loading position, in which they can receive the powder material from the dispensing device (20), to an unloading position, in which they can unload the powder material;
    wherein the dispensing device (20) comprises a number of dispensing elements, placed consecutively, one next to the other, transversely and above an upper portion of the support element (10), each of which being controlled digitally so as to open and close, and each of which is configured to dispense the powder material into one or more cavities (11) selected in advance.

2. The machine according to claim 1, wherein the unloading device (30) is structured so as to move the cavities (11) between a loading position, in which they are turned upward in order to receive the powder material from the dispensing device (20), and an unloading position, in which they are turned at least partially downward in order to unload the powder material downward, substantially by gravity.

3. The machine according to claim 1, wherein the support element (10) comprises a flexible belt on which the cavities (11) are formed.

4. The machine according to claim 3, wherein the unloading device (30) comprises at least one rotating roller (31), around which the support element (10) is at least partially wrapped, the rotating roller (31) causing the support element (10) to rotate in such a way as to progressively move the cavities (11) from the loading position to the unloading position.

5. The machine according to claim 3, wherein the unloading device (30) comprises a pair of rollers (31,32), around which the support element (10) is wrapped in such a way as to define a closed loop path, and wherein the rollers (31,32) cause the support element (10) to slide along the closed path in such a way as to progressively move the cavities (11) from the loading position to the unloading position.

6. The machine according to claim 1, wherein, in the loading position, the cavities (11) lie in a horizontal plane.

7. The machine according to claim 1, wherein the dispensing device (20) is mobile relative to the support element (10).

8. The machine according to claim 1, wherein the unit comprising a support element (10), a dispensing device (20) and an unloading device (30) is mobile both ways along a direction of movement (Y).

9. The machine according to claim 1, comprising a deposition surface (50) disposed in such a way as to receive the powder material unloaded from the cavities (11).

10. The machine according to claim 9, wherein the deposition surface (50) is located below the unloading position of the cavities (11).

11. The machine according to claim 10, comprising a mobile surface (83) having an active portion (84) that is mobile along the longitudinal direction (Y), wherein the deposition surface (50) is substantially aligned and adjacent, at a greater height than the active portion (84) of the mobile surface (83), so that a front end (51) of the deposition surface (50) is positioned at least partially above a rear end (83a) of the mobile surface (83).

12. The machine according to claim 11, wherein the deposition surface (50) and the mobile surface (83) are activated in such a way that the relative motion between the powder material coming from the cavities (11) and the deposition surface (50) has a direction which is opposite to that of the relative motion between the powder material coming from the deposition surface (50) and the mobile surface (83).

13. The machine according to claim 1, comprising a filling device (40), located downstream of the dispensing device (20) relative to the direction of forward travel of the support element (10), which is configured to fill up, with a powder material, the cavities (11) that have not been filled or have been partially filled by the dispensing device (20).

14. The machine according to claim 13, comprising a blade (41) disposed in contact with the upper portion of the support element (10), downstream of the filling device (40), in order to remove the powder material exceeding the depth or height of the cavities (11).

15. The machine according to claim 1, comprising a containment barrier (33), disposed and shaped in such a way as to intercept the material that is unloaded from the cavities (11), in order to guide or divert the trajectory thereof in a pre-established manner.

16. The machine according to claim 15, wherein the barrier (33) comprises a pair of walls (33a, 33b) set side by side so as to define a collection space (33c) for the material that is unloaded from the cavities (11).

17. The machine according to claim 16, wherein the first wall (33a) is disposed and shaped in such a way as to intercept the material that is unloaded from the cavities (11), so as to guide or divert its trajectory inside the collection space (33c).

18. The machine according to claim 16, wherein the first wall (33a) has a lower edge (E) that is raised by a certain height relative to a deposition surface.

19. The machine according to claim 16, wherein a forward travel speed of a deposition surface (50) and a forward travel speed of the support element (10) are adjusted in such a way that the amount of material accumulated in the collection space (33c) remains substantially constant.

20. The machine according to claim 16, wherein a forward travel speed of a deposition surface (50) and a forward travel speed of the support element (10) are adjusted in such a way that a height (h), measured relative to the deposition surface (50), of the material inside the collection space (33c) remains substantially constant.

* * * * *